United States Patent
Vajravelu et al.

(10) Patent No.: US 9,992,202 B2
(45) Date of Patent: Jun. 5, 2018

(54) ACCESS CONTROL THROUGH DYNAMIC GROUPING

(71) Applicant: Aruba Networks, Inc., Sunnyvale, CA (US)

(72) Inventors: Edward Vajravelu, Karnataka (IN); Partha Narasimhan, Saratoga, CA (US); Sachin Shamrao Sanap, Karnataka (IN); Gopal Agarwal, Karnataka (IN)

(73) Assignee: ARUBA NETWORKS, INC, Sunnyvale, CA (US)

( * ) Notice: Subject to any disclaimer, the term of this patent is extended or adjusted under 35 U.S.C. 154(b) by 143 days.

(21) Appl. No.: 14/700,768

(22) Filed: Apr. 30, 2015

(65) Prior Publication Data
US 2016/0255086 A1 Sep. 1, 2016

(51) Int. Cl.
*H04L 29/06* (2006.01)
*H04L 29/08* (2006.01)

(52) U.S. Cl.
CPC .................. *H04L 63/101* (2013.01)

(58) Field of Classification Search
CPC ....... H04L 63/08; H04L 63/10; H04L 63/102; H04W 12/06; H04W 12/08
See application file for complete search history.

(56) References Cited

U.S. PATENT DOCUMENTS

| | | | | |
|---|---|---|---|---|
| 7,721,323 B2* | 5/2010 | Finn | ....................... | H04L 63/08 |
| | | | | 713/160 |
| 7,840,708 B2* | 11/2010 | Smith | ..................... | H04L 63/08 |
| | | | | 709/245 |
| 8,625,603 B1* | 1/2014 | Ramakrishnan | .... | H04L 12/4641 |
| | | | | 370/395.3 |
| 9,231,911 B2* | 1/2016 | Setia | .................... | H04L 63/0227 |
| 9,444,821 B2* | 9/2016 | Fukushima | ........... | H04L 63/101 |
| 9,455,990 B2* | 9/2016 | Beedubail | ........... | G06F 21/6218 |
| 9,667,551 B2* | 5/2017 | Edsall | ................. | H04L 41/0893 |
| 9,767,268 B2* | 9/2017 | Truong | .................... | G06F 21/41 |
| 2004/0010619 A1* | 1/2004 | Thomas | ............ | H04L 29/12009 |
| | | | | 709/245 |
| 2005/0055573 A1* | 3/2005 | Smith | ................. | G06F 21/6218 |
| | | | | 726/4 |

(Continued)

*Primary Examiner* — Yonas Bayou
(74) *Attorney, Agent, or Firm* — Hewlett Packard Enterprise Patent Department (57) ABSTRACT

Certain aspects and features of the present disclosure relate to providing access control using groups that can be dynamically controlled by group owners, such access control hereinafter referred to as group access control. Group access control can be used to control the transmission of packets on a network layer, or for other access control. A network administrator can provide users with permissions, such as using user roles. Users can then establish groups to share permissions with other users. A group is established by a group owner, who can modify the member list of that group and modify what permissions will be passed on to group members all without the involvement of a network administrator. Members of a group can include users, devices, and network resources. Additionally, data path entities (e.g. routers and access points) can facilitate delivery of packets between group members across multiple logical networks.

22 Claims, 8 Drawing Sheets

(56) References Cited

U.S. PATENT DOCUMENTS

| | | | |
|---|---|---|---|
| 2006/0149965 A1* | 7/2006 | Sharma | H04L 12/18 713/163 |
| 2007/0239987 A1* | 10/2007 | Hoole | H04L 63/102 713/169 |
| 2009/0213859 A1* | 8/2009 | De Silva | H04L 12/4625 370/395.53 |

\* cited by examiner

ACCESS CONTROL THROUGH DYNAMIC GROUPING

CROSS REFERENCE TO RELATED APPLICATIONS

This application claims the benefit of Indian Application No. 981/CHE/2015, filed Feb. 28, 2015, entitled "Access Control Through Dynamic Grouping," the disclosure of which is incorporated by reference herein in its entirety.

TECHNICAL FIELD

The present disclosure relates to computer networking generally and more specifically to access control in computer networks.

BRIEF DESCRIPTION OF THE DRAWINGS

The specification makes reference to the following appended figures, in which use of like reference numerals in different figures is intended to illustrate like or analogous components

DETAILED DESCRIPTION

Certain aspects and features of the present disclosure relate to providing access control using groups that can be dynamically controlled by group owners, such access control hereinafter referred to as group access control. Group access control can be used to control the transmission of packets on a network layer, or for other access control. A network administrator can provide users with permissions (e.g., by implementing user roles). Users can then establish groups to share permissions with other users. A group is established by a group owner, who can modify the member list of that group and modify what permissions will be passed on to group members all without the involvement of a network administrator. Members of a group can include users, devices, and network resources. Additionally, data path entities (e.g. routers and access points) can facilitate delivery of packets between group members across multiple logical networks. Group access control can allow network hardware to intelligently, efficiently, and dynamically accept, deny, route, forward, and otherwise handle data packets being sent through a network infrastructure, which can provide increases in network speed, bandwidth, reliability, security, and manageability, among others.

In a computer network, devices communicate with one another by transmitting packets through the computer network. Each device on the network can be assigned an address, such as an internet protocol (IP) address. A single device can transmit information to a targeted device by addressing the packet to that targeted device, such as by including a destination IP address in the packet. A data path entity (e.g., an access point, a router, or controller) can facilitate the transmission of packets from a source device to a destination device.

Data path entities can process each packet received by the data path entity to determine whether or not the source device has sufficient permissions to communicate with the destination device. A data path entity can read an access control list (ACL) to determine whether the source device has sufficient permissions to communicate with the destination device.

An "access point" (AP), as used herein, is intended to refer to a special-purpose communication device that includes radio transceiver(s), antenna(s), and device firmware enabled to provide wireless connectivity to one or more client devices on a network. APs may also provide a bridging capability that enables one network to connect to another network. Utilization by the AP of the techniques described herein may provide improved traffic forwarding between the AP and a controller located at an organization's primary campus (e.g., a corporate campus). A "controller," as used herein, is intended to refer to a network device that is used for organization-wide management of one or more APs and one or more users/client devices. Additionally, a controller may be enabled to provide access authentication, managed encryption, and firewall features.

Network access control can be provided on one level through the use of user roles. A network administrator can generate a plurality of user roles depending on the needs and structure of the network. For example, a college environment may have user rules including "Student" and "Teacher" and "Administrator" and "IT" as well as others. Each user role may have various permissions based on an access control list (ACL). For example, the "Student" user role may have access to a "Homework Server" but would not have access to a "Solutions Server," while a "Teacher" user role may have access to both the "Homework Server" and the "Solutions Server." If a teacher wishes to provide access to the "Solutions Server," or a part thereof, for one, several, or all students for a certain duration of time or while the student is in the classroom, the teacher would need to work closely with a network administrator to create new, temporary user roles, adjust the existing user roles, or provide temporary, specific access on a per-student or per-device basis. However, according to certain aspects and features of the present disclosure, one user can use group access control to dynamically modify permissions of other users. In the above example, the Teacher can use group access control to simply select one, several, or all students to be part of one of the Teacher's groups and the Teacher can change the permissions of the members of the Teacher's group in in order to grant access to the "Solutions Server." Furthermore, the teacher would be able to programmatically grant access, such as based on student location, time of day, or date.

In addition to controlling access based on users (e.g., Students and Teachers), access control can be provided based on devices (e.g., printers and projectors). Additionally, as more internet of things (IOT) devices are incorporated into a network, users may wish to provide or deny access to those devices without involving a network administrator. When first installed on a network, a network administrators can provide a base level of permissions to a device using user roles. For example, a Teacher can be initially granted permissions to use a printer and projector located in that teacher's classroom simply by being in the "Teacher" user role. Thereafter, in order to provide that Teacher's Students with temporary or ongoing access to the classroom's printer, the Teacher can establish a group and include each of the Teacher's Students in that group. The Teacher can then grant printer access to one, some, or all of the members of the group. Likewise, the Teacher can temporarily grant access to the classroom's projector to a single Student during a single class in order for that Student to present a project to the rest of the students in the classroom on that day.

Group access control enables a user who already has certain permissions on a computer network to extend those permissions to members of a group for which that user is a group owner.

Additionally, group access control can be used to intelligently route information (e.g. packets) across multiple logical networks. In some circumstances, it may be necessary or desirable to segregate network devices into multiple logical networks (e.g., subnets or virtual local area networks ("VLANS")). Separate logical networks can be based on location (e.g., users in a first room belong to a first logical network while users in a second room belong to a second logical network) or can be irrespective of location (e.g., two logical networks exist within a single room). In order to transmit a packet from a device in one logical network to a device in a separate logical network, some data path entity must facilitate the transmission. Using group access control, a data path entity can determine whether the source device and the destination device are in a common group, and if so, the data path entity can automatically facilitate the transmission between the logical networks (e.g., by forwarding the packet or a portion of the packet to the destination device). The data path entity may work with other data path entities to facilitate the transmission. In this way, network devices can communicate with other network devices in a common group without worrying about whether or not they are on the same logical network.

Additionally, group access control can be used to provide network segregation when multiple network devices are on the same logical network. A first device and a second device may be located on the same logical network, but because they do not belong to a common group, the data path entity of that logical network can restrict any communication between the two devices. For example, a first device can send a packet directed to the second device. When the data path entity (e.g., a wireless access point) receives the packet, the data path entity can determine that the two devices are not in any common group, and the data path entity would not allow the packet to be transmitted to the second device. Such implementations can be useful, for example, to increase security on a public network where multiple users may be connected to a single logical network, but where segregation between the users' devices is desired. Additionally, in such a network, it can be easy for a user to de-segregate all of a user's devices (e.g., a computer, a tablet, and a smartphone) simply by creating a group and adding each of the user's devices as members of the group. Thereafter, each of the user's devices would be able to communicate with one another. Group access control can expand the options for network topology and layout, since fewer logical networks may be necessary to accomplish the same network segregation. Additionally, group access control can reduce reliance on bridging equipment that would otherwise be necessary to link together multiple logical networks, since group access control can automatically enable communication between devices regardless of the logical network.

Group access control allows for dynamic management of access control without the need to involve a network administrator. Additionally, group access control allows for the dynamic creation and management of groups, thus enabling the control of network permissions without the need for a network administrator to pre-establish user roles that might be needed, generate new user roles whenever one is needed, and modify existing user roles on request. Furthermore, the management of complex user roles is not scalable for large numbers of user and large numbers of network devices, including personal devices. Group access control, however, can be managed by each user, and thus easily scales with each user on the network.

In use, any user can create a group, thus becoming the group owner. The group owner can add or delete members in the group. In some embodiments, a user must accept an invitation to be added as a member of a group. In some embodiments, a user can exit a group from which they no longer wish to belong. In some embodiments, restrictions can be put in place to force a member to be added to a group and to disable a user's ability to exit a group. The group owner can apply policies which are applicable to the members of the group. The group owner is able to extend only those privileges already extended to the group owner (e.g., via another group or via a user role or other access control measure). In some embodiments, the group owner is only able to extend those privileges already extended to the group owner from a network administrator, such as through the use of user roles. In some embodiments, a network administrator can change the owner of a group.

Group membership and permissions can be automated or programmatically controlled, such as based on parameters such as location and time. For example, users can be automatically added to a particular group when the user is present in a particular room (e.g., meeting attendees are added to a common group with a projector in the meeting room as the meeting attendees enter the room or log onto the access point located in that room). Group membership and permissions can be controlled through external applications, such as an application running on a computing device or through a website. Group membership and permissions can also be controlled through a physical interaction, such as the transmission of information from one device to another device not through the computer network. An example of such a physical interaction can be a student scanning, at a terminal, quick response (QR) code being displayed on the student's computer or smartphone when the student walks into a classroom to take an exam. By scanning the QR code, the terminal can automatically place the student or the student's device into the proper group and can give the proper permissions in order for the student to access certain resources during the classroom, such as to access an exam server. Therefore, any student attempting to take the exam by accessing the exam server remotely would be unable to do so since that remote student wasn't able to physically scan his or her QR code at the terminal in the classroom. Similar and different physical interactions can be used to grant access to resources in a room upon or after entering the room, such as to grant access to a projector in a meeting room to meeting attendees or presenters.

In an embodiment, groups can be established dynamically based on location, time, or other parameters. In some embodiments, groups can be established dynamically based on known events or meetings, such as calendar entries or calendar invitations on a user's electronic calendar.

Using the group access control paradigm, groups can be logical tags that are associated with users, network devices, software, applications, or other resources accessible through the network.

In an embodiment, upon receiving a packet, a data path entity (e.g., an access point) can access a group access control database containing information for a plurality of groups. The data path entity can determine one or more groups to which the source device belongs, such as by comparing the source address (e.g., IP address) to the member lists of the plurality of groups. The data path entity can then determine permissions based on the one or more groups to which the source device belongs. If the source device has sufficient permission to transmit the packet as indicated, the data path entity can facilitate delivery of the packet or its payload. In some embodiments, permissions can cause the data path entity facilitate delivery of the packet or its payload according to defined quality of service limitations.

In some embodiments, data path entity can determine that the source device and the destination device related to the packet received by the data path entity are in the same group. Based on the determination of a common group, the data path entity can determine that the devices have permission to communicate with one another and can facilitate delivery of the packet or its payload accordingly. In some embodiments, permissions can cause the data path entity facilitate delivery of the packet or its payload according to defined quality of service limitations.

In an example workflow, a user can start using group access control by creating a group through a user interface, such as an interface on an application running on a computing device or an interface on a website. Once created, the user becomes the group owner. The group owner can then assign or invite members to the group and create permissions (e.g., rules) to be applied for the group members. The permissions created by the group owner can only include up to those privileges already extended to the group owner. Once created, the group access control information, which may include group identification information, member information, owner information, and permissions information, can be sent to a policy controller or to one or more data path entities. When used, the policy controller can handle store the group access control information and can optionally handle disseminating group access control information among various data path entities in a network.

In one example implementation, group access control can be integrated into a user role access control scheme. In such implementations, the data path entity, upon receiving a packet, begins analyzing permissions according to user roles. As an initial or early step in analyzing permissions according to user roles, the data path entity can be prompted to determine whether or not it can apply group access control by determining whether or not the source device (e.g., a user of the device or the device itself) belongs to a group. If the source device belongs to a group, the data path entity can simply apply the permissions of the group(s) to which the device belongs. However, if the source device does not belong to a group, the data path entity can continue processing the permissions according to user roles or other access control schemes.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

Figure 1:
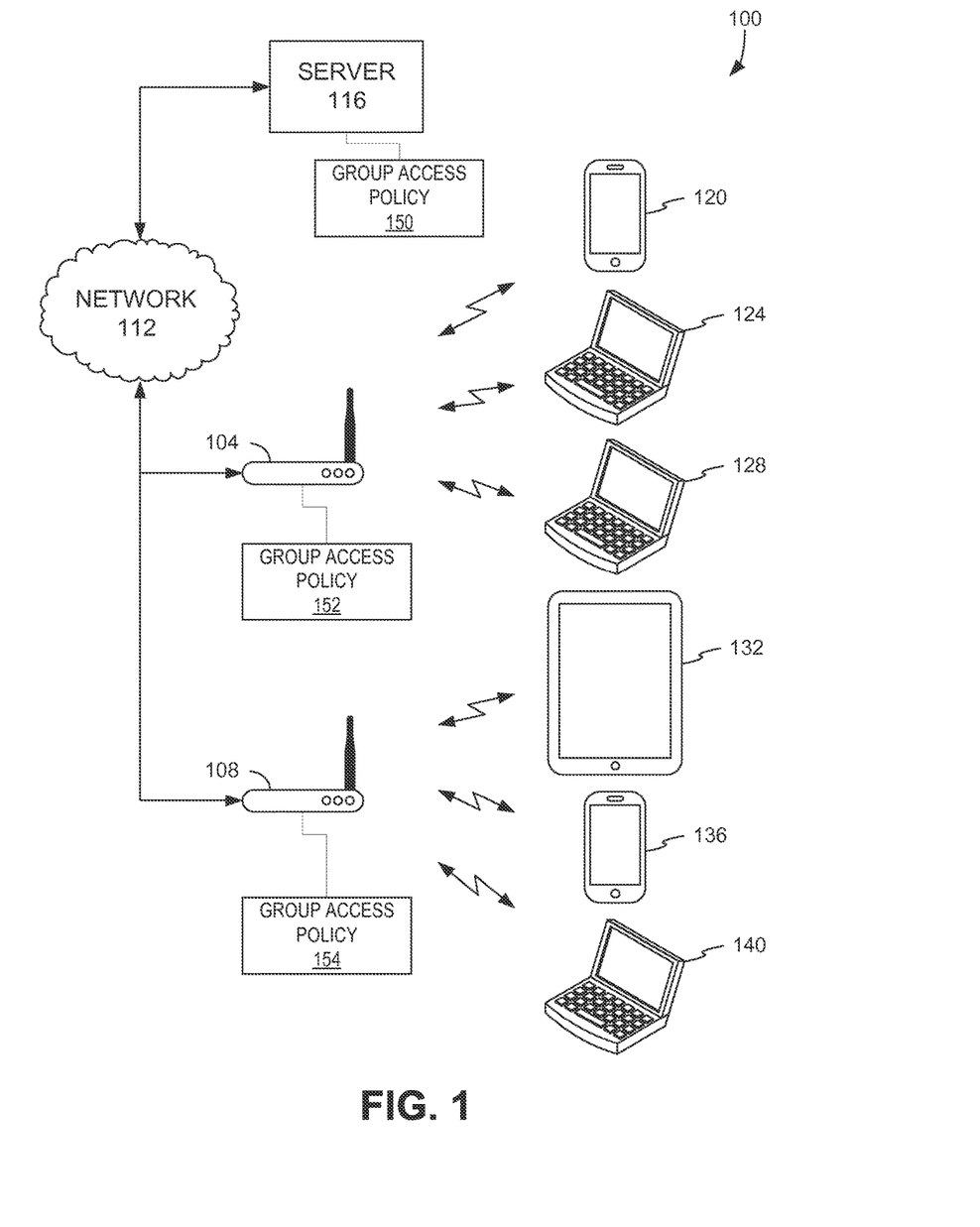
FIG. 1 is a schematic depiction of a network communications environment according to certain aspects of the present disclosure.

FIG. 1 is a schematic depiction of a network communications environment 100 according to certain aspects of the present disclosure. The network communications environment 100 includes data path entity 104 and data path entity 108 coupled to a network 112. Data path entity 104 and data path entity 108 can be any suitable data path entity, such as a wireless access point for wireless connecting network devices to a network 112 (e.g., through standard network protocols such as the Institute of Electrical and Electronics Engineers (IEEE) 802.11 protocols). Network 112 may be a local network, a corporate network, a wide area network, the Internet, etc., without limitation. Data path entity 104 and data path entity 108 are optionally interconnected to one another, for example directly or using one or more intermediary network devices, such as switches, routers and hubs. Network communications environment 100 further includes network devices 120, 124 and 128 associated with data path entity 104 and network devices 132, 136 and 140 associated with the data path entity 108. A server 116 is also shown as a component of network communications environment 100. Network connections between network communications environment 100 may be wired and/or wireless.

As illustrated, network devices 120 and 136 are represented as smartphones, network device 132 is represented as a tablet computer, and network devices 124, 128 and 140 are represented as laptop computers. Other network devices are capable of wirelessly associating with data path entities 104 and 108, such as, but not limited to, smart watches, smart appliances, personal computers, wireless bridges, and other wireless network devices.

In various embodiments, data path entities 104 and 108 include hardware allowing for wired network connections, such as wired network connections compliant with an IEEE 802.3 standard, such as fast Ethernet or gigabit Ethernet. Although not shown, network communications environment 100 may optionally include additional network devices, such as network devices including, but not limited to routers, gateways, modems, hubs, switches, firewalls, etc., as will be understood by the skilled artisan.

Additionally, network communications environment 100 may include one or more servers, client devices, access devices, such as using wired and/or wireless network connections. For example, server 116 may represent any computer server system connected to network 112 and accessible by other devices in communications environment 100. For example, server 116 may be an Internet server, such as a webserver, an application server, or other network attached computing device or an Internet connected personal computer. In an embodiment, server 116 is or includes a controller for managing one or more of the network devices in communications environment 100. For example, server 116 may include a controller for managing data path entity 104 and/or data path entity 108. Optionally, a controller may be included on one or both of data path entity 104 and data path entity 108 or any other network device in network communications environment 100. Server 116 may, optionally, provide an interface for management of data path entity 104 and/or data path entity 108.

In an embodiment, sever 116 can be a controller that stores a group access policy 150. The group access policy 150 can include the group access control information, which may include group identification information, member information, owner information, and permissions information. The group access policy can be used by data path entities 104, 108 to control network access as described in further detail herein. The data path entities 104, 108 can access the group access policy 150 directly from the server 116 or can store a local copy of the group access policy 152, 154, respectively. The server 116 can be a policy controller than maintains an updated copy of the group access policy 150 and pushes updates to the local copies of the group access policy 152, 154 of the data path entities 104, 108. In some embodiments, one of data path entities 104, 108 can be a policy controller that pushes updates to the group access policy 152, 154 to other devices.

Figure 2:
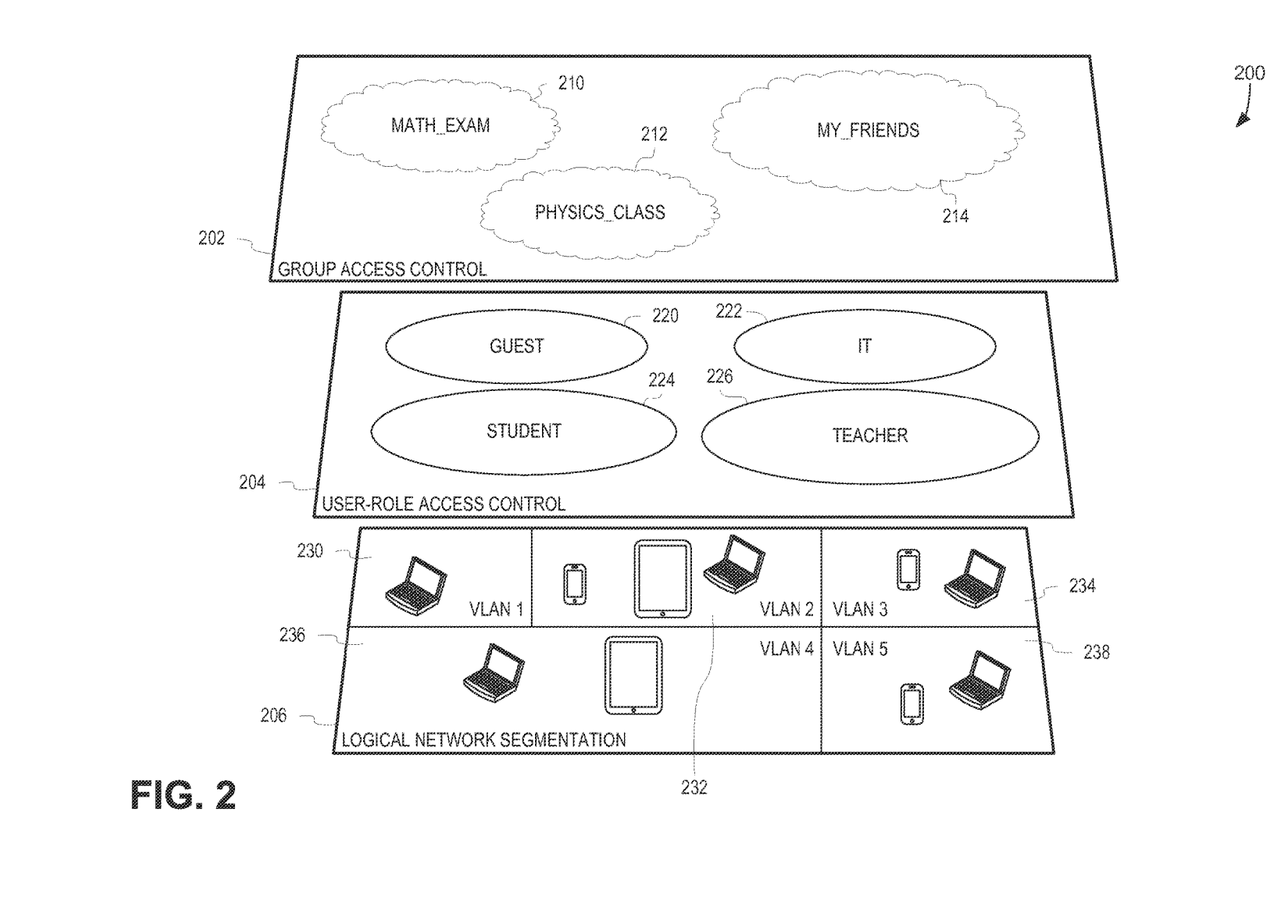
FIG. 2 is a schematic depiction of a group access control paradigm according to certain aspects of the present disclosure.

FIG. 2 is a schematic depiction of a group access control paradigm 200 according to certain aspects of the present disclosure. The group access control paradigm 200 can consists of multiple layers operating in conjunction with one another. The group access control layer 202 can operate alongside a user-role access control layer 204 and a logical network segmentation layer 206. Other layers can be implemented as well.

The logical network segmentation layer 206 depicts how a network can be segmented into multiple logical networks, such as subnets or virtual local area networks (VLANs). The figure shows VLANs 1 to 5 identified by numerals 230, 232, 234, 236, and 238. Other numbers of VLANs or other types of logical networks can be used. Each VLAN 230, 232, 234, 236, 238 contains one or more network devices. Generally, each network device can only communicate with other network devices within the same VLAN 230, 232, 234, 236, 238 unless a data path entity otherwise facilitates (e.g., as described in further detail herein) the transmission of data between VLANs 230, 232, 234, 236, 238.

The user-role access control layer 204 depicts how user roles 220, 222, 224, 226 can be established to provide pre-set permissions to users assigned to those user roles 220, 222, 224, 226. A network administrator manages the user roles 220, 222, 224, 226 and is required to make any changes to a user role 220, 222, 224, 226 or to create new user roles. As depicted, a guest role 220, an IT role 222, a student role 224, and a teacher role 226 are created. Each user role 220, 222, 224, 226 can include various permissions specific to that user role 220, 222, 224, 226. For example, all users with the teacher role 226 may have access to certain devices (e.g., servers) that students (e.g., users with the student role 224) do not have access.

The group access control layer 202 depicts several groups 210, 212, 214 that have been created in the overall group access policy. More or fewer groups 210, 212, 214 can be created. Each group 210, 212, 214 includes a group owner, which can be a user (e.g., an individual's user account or a virtual user account, such as one for a meeting room), a device, or a resource. Each group 210, 212, 214 includes a list of members. In some embodiments, a group can have zero members excluding the group owner, and up to as many members as limited by hardware or software constraints. As depicted, a MATH_EXAM group 210, a PHYSICS_CLASS group 212, and a MY_FRIENDS group 214 are shown.

In an example, the MATH_EXAM group 210 can be a temporary group that is created by a teacher (e.g., a user with the teacher role 226) for the purposes of administrating an exam on a particular day. The MATH_EXAM group 210 can include members that are students (e.g., users with the student role 224) as well as other devices and resources, such as a math exam server housing materials necessary for administering the exam. The teacher can set up the MATH_EXAM group 210 members and can adjust the permissions of the MATH_EXAM group 210 such that its members are permitted to communicate with one another only during a specified time period (e.g., from 1:07 pm until 2:30 pm on the day of the exam). Therefore, at 1:07 pm, all of the students in the MATH_EXAM group 210 will be able to access the math exam server, which is also a member of the MATH_EXAM group 210, such as to download test materials and begin answering questions. At 2:30 pm, the permissions will cut off pursuant to the rules selected by the teacher, so the students in the MATH_EXAM group 210 will no longer be able to access the math exam server, and thus must turn in their exam responses prior to that cut-off time. The teacher can dynamically update the MATH_EXAM group 210 as needed during the day, such as to add or remove members, adjust permissions (e.g., to allow for extra time if the exam began late), or to completely remove the MATH_EXAM group 210 if it is no longer needed at the end of the day.

In the MATH_EXAM group 210 example, the math exam server can be located in VLAN 1 230 and the students' devices can be located in VLAN 2 232. Other devices that are not associated with the MATH_EXAM group 210 may also be in VLAN 2 232. When a data path entity in VLAN 2 232 receives communications directed to the math exam server from one of the students' devices that is associated with the MATH_EXAM group 210, the data path entity can automatically determine that the device and the math exam server share a common group (e.g., the MATH_EXAM group 210) and facilitate transmitting the communications to the math exam server in VLAN 1 230. The process can operate likewise in the reverse direction. However, when a data path entity in VLAN 2 232 receives communications directed to the math exam server from a device that is not associated with the MATH_EXAM group 210, the data path entity can automatically determine that the device and the math exam server do not share a common group, and the data path entity can refuse to facilitate communication between the device and the math exam server.

In another example, the PHYSICS_CLASS group 212 can be a semi-permanent group that is created automatically by enrollment software at a school. The enrollment software can automatically determine a list of students that are assigned to a particular physics class and can update the group access policy to include those students in the PHYSICS_CLASS group 212, as well as teachers teaching the group. In such an example, the group owner for the PHYSICS_CLASS group 212 may be a resource (e.g., the physics classroom) or a virtual user account (e.g., a user account set up for that particular class). The group owner can have access to certain resources, such as a physics homework server and a classroom printer. Other automated processes can be used to automatically modify the group access policy as needed. Students enrolled in the PHYSICS_CLASS group 212 would have access to the same resources as the group owner (e.g., the physics homework server and the classroom printer) and would be able to communicate with one another regardless of being on different logical networks.

In another example, the MY_FRIENDS group 214 can be a temporary group that is created by a user in any of the user roles 220, 222, 224, 226. The user is the group owner. The user can include various devices in the member list of the group, such as the user's computer, smartphone, printer, remote-controlled lights, and video game system. The user can dynamically add other users to the MY_FRIENDS group 214 whenever the user wants to allow other users to access the user's devices. For example, the user can add a friend's video game system to the MY_FRIENDS group 214, so that the user's video game system and the friend's video game system can communicate with one another (e.g., to play a multiplayer game over the network), regardless as to whether or not the two video games systems are on different logical networks or the same logical network.

Figure 3:
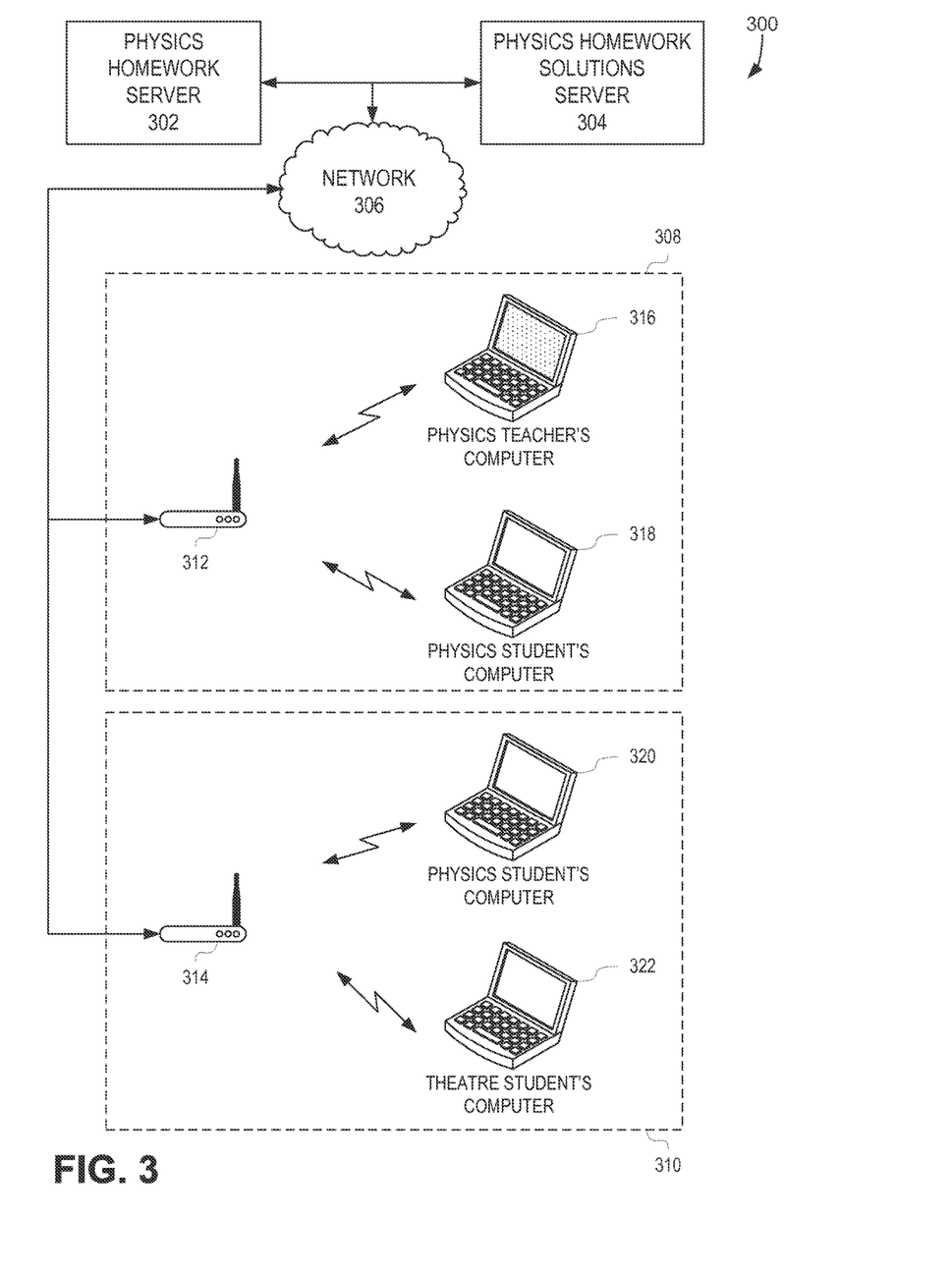
FIG. 3 is a schematic depiction of a university network communications environment according to certain aspects of the present disclosure.

FIG. 3 is a schematic depiction of a university network communications environment 300 according to certain aspects of the present disclosure. The university network communications environment 300 can include access points 312, 314 coupled to a network 306. A physics homework server 302 and a physics homework solutions server 304 can be on the network. The network can include other devices, such as other computers, access points, controllers, data path entities, or any other network device. A physics teacher's computer 316 and a physics student's computer 318 can be coupled to the network 306 through access point 312. Another physics student's computer 320 and a theatre student's computer 322 can be coupled to the network 306 through access point 314. The physics teacher's computer 316 and physics student's computer 318 are in logical network 308. The physics student's computer 320 and theatre student's computer 322 are in logical network 310.

The physics teacher's compute 316 can be a group owner for a physics class group. The physics teacher can have pre-existing permissions (e.g., through a user role, such as a teacher role) to access both the physics homework server 302 and the physics homework solutions server 304. The physics teacher, being the group owner for the physics class group, can add the physics student's computers 318, 320 to the physics class group and assign permission to the members of the group. The physics teacher can also add the physics homework server 302 to the group. The permissions and/or presence of the physics homework server 302 in the group can allow the members of the group (e.g., physics student's computers 318, 320) to access the physics homework server 302. Therefore, the physics students would be able to turn in their homework assignments through the network, regardless as to which logical network 308, 310 their computers 318, 320 are connected. The theatre student's computer 322, however, not being in the physics class group, would be unable to communicate with the physics homework server 302.

At any time, if the teacher wishes to allow the physics students access to the physics homework solutions server 304, such as to check their work on a previous week's homework, the teacher can add the physics homework solutions server 304 to the group and/or add permissions to the group enabling access to the physics homework solutions server 304.

Additionally, since theatre student's computer 322 is in a different logical network 310 than the logical network 308 of the physics student's computer 318, the theatre student's computer 322 would be unable to communicate with the physics student's computer 318. However, because physics student's computer 320 is in the same group as physics student's computer 318, communications directed between the two computers 318, 320 would pass through their respective access points 312, 314 and be transmitted to the correct destination. For example, a packet directed from physics student's computer 320 to physics student's computer 318 would first be received by access point 314. Upon determining that the two computers 318, 320 are in the same group, the access point 314 can transmit the packet to access point 312, which would then transmit the packet to the physics student's computer 318. In this way, inter-logical network communication can be facilitated by the data path entities using group access control.

While describe with regards to classes, teachers, and students in a university environment, the examples given herein can be translated to many other home, school, or business environments where it may be desirable to have a non-administrator user easily and quickly adjust access control privileges. The embodiments described herein can be used to quickly, easily, and dynamically, and optionally programmatically, adjust access control on the network layer (e.g., layer 3 of the Open Systems Interconnection (OSI) model) without the need to involve a network administrator.

Figure 4:
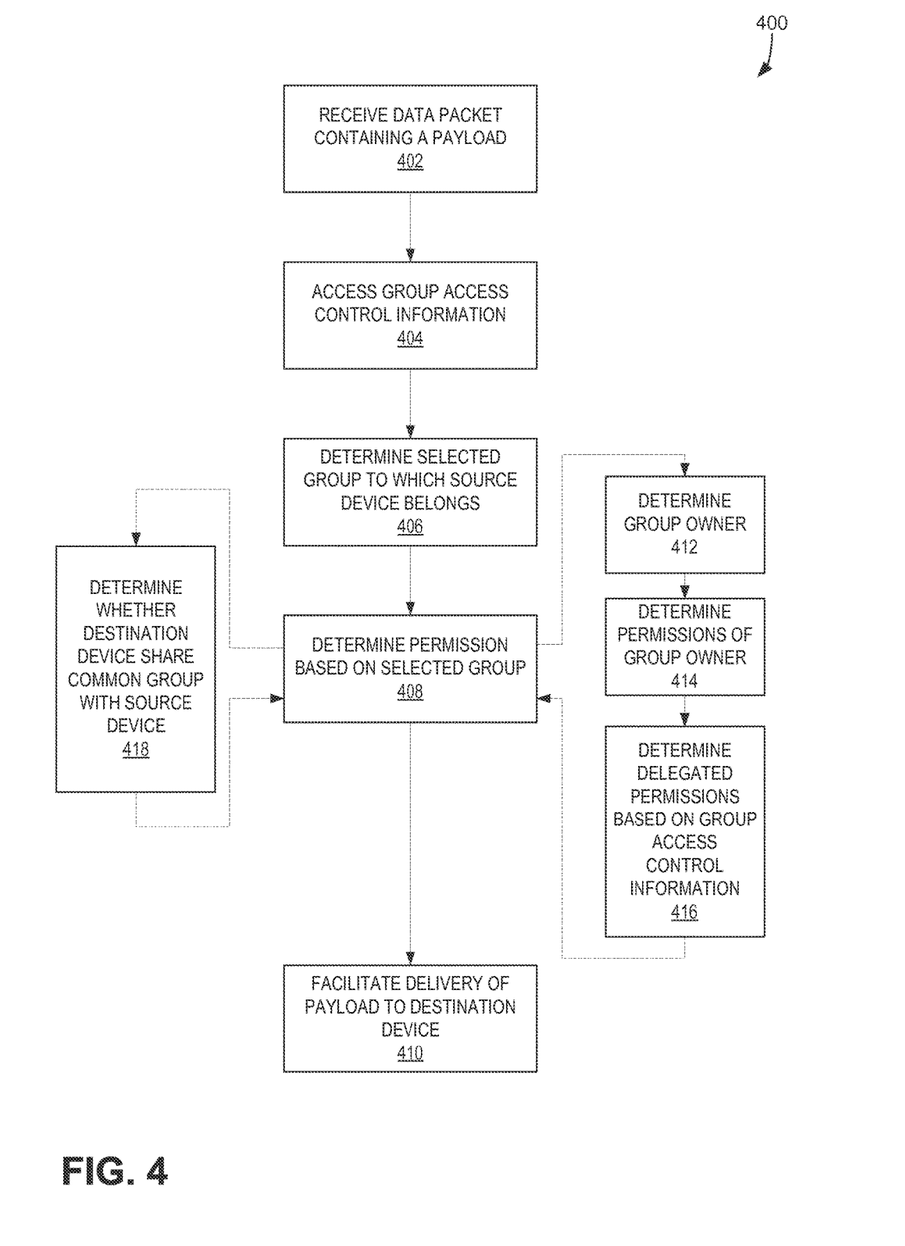
FIG. 4 is a flow chart depicting a method of facilitating network communications using group access control information according to certain aspects of the present disclosure.

FIG. 4 is a flow chart depicting a method 400 of facilitating network communications using group access control information according to certain aspects of the present disclosure. At block 402, a data packet is received by a data path entity (e.g., an access point). The data packet contains a payload (e.g., data to be delivered). The data packet can also include control information, such as a source address (e.g., address of the device sending the data packet) and a destination address (e.g., address of the device to which the data packet is sent). In some embodiments, the destination address can be a unicast address indicative of a single destination device or a multicast address indicative of multiple destination devices. The data path entity can read the control information from the packet.

At block 404, the data path entity access group access control information. The group access control information can be stored in a group access policy. The group access policy can be stored in the data path entity or in another device (e.g., a policy controller). The group access control information includes information about one or more groups, including some or all of group names, group identifiers, group owners, group members, and group permissions or rules.

At block 406, the data path entity determines a selected group to which the source device belongs. The data path entity can compare the source address from the packet to various entries in the group access control information in order to determine at least one group to which the source device belongs. In some embodiments, the data path entity can transmit information about the source device (e.g., the source address) to another device (e.g., a policy controller) which will perform the comparison and deliver a list of one or more groups back to the data path entity.

At block 408, the data path entity will determine a permission based on the selected group. In some embodiments, determining the permission includes reading permission information from the group access control information that is associated with the selected group. In some embodiments, determining the permission includes determining the group owner for the selected group at block 412, then determining the permission of the group owner at block 414, then determining which permissions of the group owner have been delegate based on the group access control information (e.g., permissions or rules information). In some embodiments, determining the permission can include determining that both the source device and the destination device belong to a common group at block 418. If both the source and destination devices belong to a common group, there can be a presumption that they are permitted to communicate with one another. In some cases, there may be no presumption and the data path entity will also access the permissions or rules information of the group access control information for the selected group to determine whether the source device has permission to communicate with other devices that are in its common group (e.g., the selected group).

In instances where the destination address is a multicast address, determining permission at block 408 can include generating a list of possible destination devices based on the multicast addresses and generating a list of permitted destination devices, such as described above with reference to a single destination address. The list of permitted destination devices can be later used to facilitate delivery of the payload in block 410.

When the data path entity determines that the source device is not permitted to communicate with the destination device, the data path entity will block transmission of the packet (e.g., will not forward the packet). However, if the data path entity determines that the source device is permitted to communicate with the destination device, the data path entity facilitates delivery of the payload to the destination device at block 410. In some embodiments, facilitating delivery can include forwarding the packet to the destination device. In some embodiments, facilitating delivery can include removing the payload from the packet and generating and transmitting a new packet to the destination device, the new packet containing the payload.

In some embodiments where the destination address is a multicast address, facilitating delivery can include generating new packets containing the payload of the received packet and addressing each of the new packets to each of the destination addresses associated with each destination device in the list of permitted destination devices determined at block 408.

In other embodiments where the destination address is a multicast address, facilitating delivery can include determining a list of data path entities (e.g., access points) within each logical network being used by the devices in the list of permitted destination devices. The list of data path entities will include at least one data path entity in each of the logical networks being used by the devices in the list of permitted destination devices. Facilitating delivery will continue by generating new packets containing the payload of the received packet and a multicast destination address or by forwarding the received packet out through each data path entity in the list of data path entities generated above. In other words, the data path entity that receives a packet with a multicast destination address will relay that multicast packet out to only those logical networks that are being used by devices with which the source device is permitted to communicate. Therefore, the network, including logical networks being used by non-permitted devices (e.g., devices not sharing a common group with the source device), will not be inundated with multicast packets.

Figure 5:
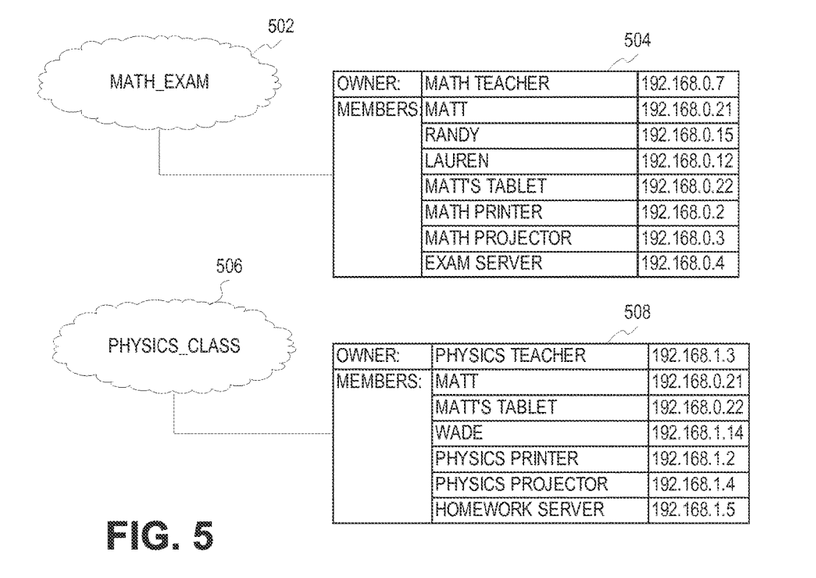
FIG. 5 is a schematic depiction of two groups of a group access policy according to certain aspects of the present disclosure.

FIG. 5 is a schematic depiction of two groups 502, 506 of a group access policy according to certain aspects of the present disclosure. The MATH_EXAM group 502 and the PHYSICS_CLASS group 506 can include group access control information 504, 508 respectively. As seen in group access control information 504, the math teacher is the group owner and the group contains multiple users and devices. As seen in group access control information 508, the physics teacher is the group owner and the group contains a different set of users and devices. Some users and devices can be common to multiple groups. For example, Matt and Matt's Tablet are present in both the MATH_EXAM group 502 and the PHYSICS_CLASS group 506. Therefore, Matt and Matt's Tablet would be able to access both the Math Printer and the Physics Printer. However, Lauren is only present in the MATH_EXAM group 502, so attempts at Lauren to access the Physics Printer would be denied, as shown in FIG. 6

Figure 6:
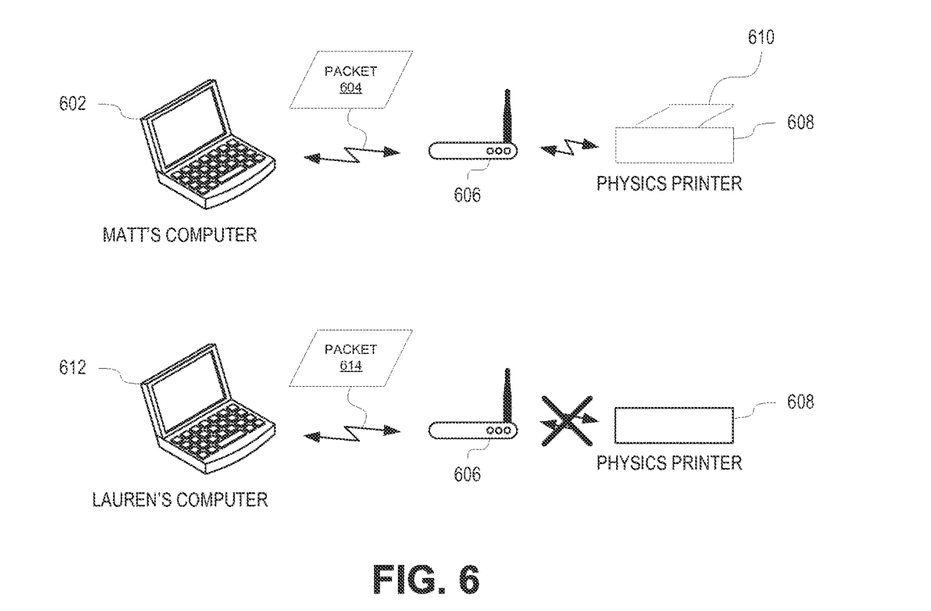
FIG. 6 is a schematic depiction of an access point using group access control information of FIG. 5 to permit or deny access to a resource according to certain aspects of the present disclosure.

FIG. 6 is a schematic depiction of an access point 606 using group access control information 504, 508 of FIG. 5 to permit or deny access to a resource according to certain aspects of the present disclosure. Matt's Computer 602, which is associated with the "Matt" entry in the group access control information 504, 508, can send a packet 604 attempting to print a document on the Physics Printer 608. The packet 604 is received by the access point 606 which determines whether Matt's Computer 602 is permitted to print to the Physics Printer 608. Upon determining that Matt's Computer 602 and the Physics Printer 608 are in the same group (e.g., PHYSICS_CLASS group 506), the access point 606 facilitates delivery of the packet 604 to the Physics Printer 608, thus producing the printed page 610.

However, if Lauren's Computer 612, which is associated with the "Lauren" entry in the group access control information 504, attempts to print to the Physics Printer 608 in the same fashion, by transmitting a packet 614, the access point 606 will see that Lauren's Computer 612 is not in the PHYSICS_CLASS group 506, but rather in the MATH_EXAM group 502, and thus is not permitted to access the Physics Printer 608. Therefore, the access point 606 will deny transmission of the packet (e.g., fail to forward the packet) onwards to the Physics Printer 608, and thus no printout will be produced.

Figure 7:
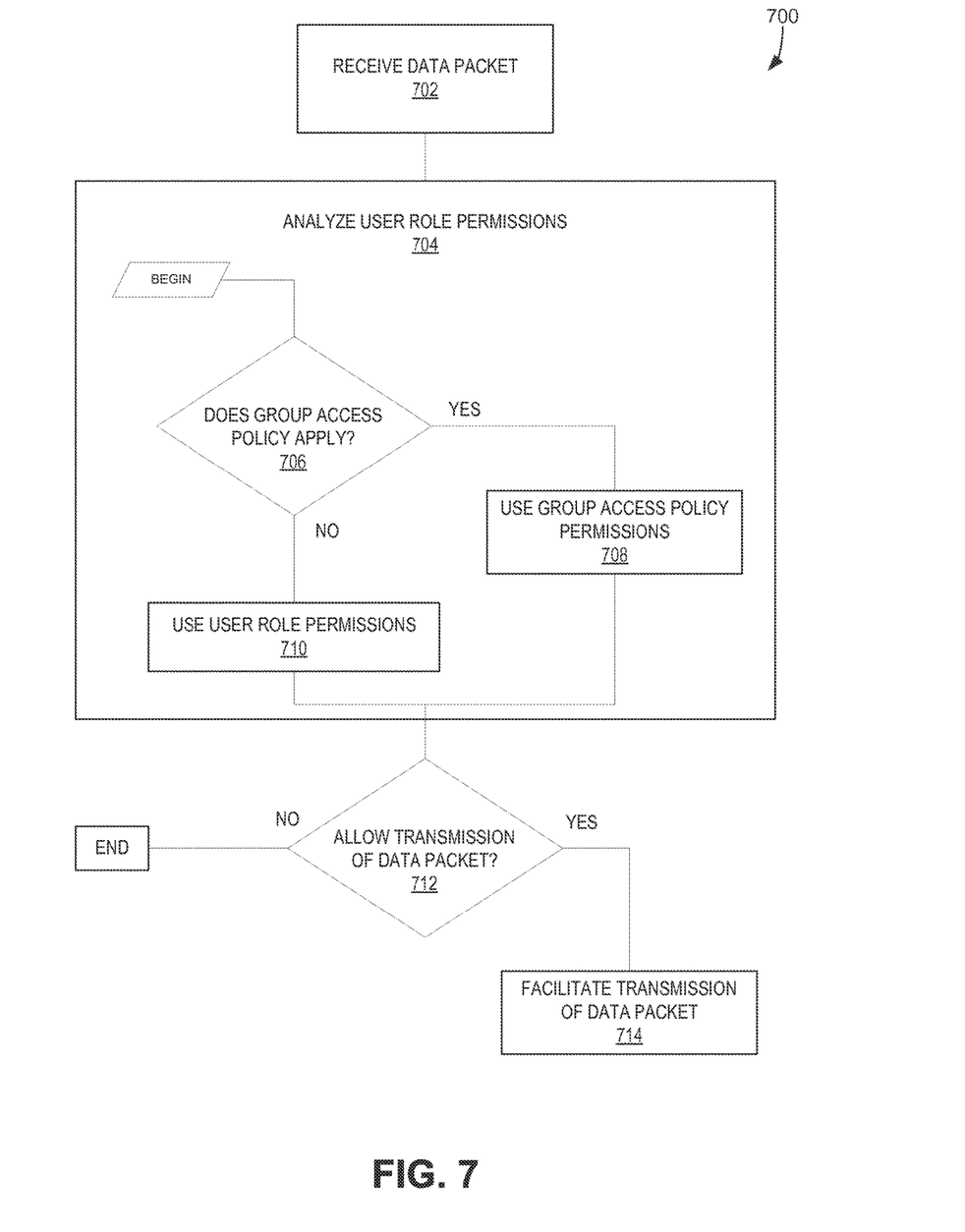
FIG. 7 is a flow chart depicting a method of facilitating network communication using group access control information while analyzing user role permissions according to certain aspects of the present disclosure.

FIG. 7 is a flow chart depicting a method 700 of facilitating network communication using group access control information while analyzing user role permissions according to certain aspects of the present disclosure. At block 702, a data path entity can receive a data packet. In order to determine how to handle the packet, the data path entity can begin analyzing user role permissions at block 704. The group access control paradigm can be incorporated into a network environment by using data path entities programmed to handle the group access control paradigm and by incorporating a group identifier into user roles of the network environment. Therefore, as the data path entity begins to analyze the user role permissions at block 704, it will immediately test to determine whether group access policy applies to the packet at block 706. The determination as to whether group access policy applies at block 706 can include determining whether the source device is in a group and optionally whether the group includes any information indicative or permissions (e.g., explicit permissions or rules in the group access control information or simply by having the source device and destination device share a common group). If it is determined that group access policy applies at block 706, then the data path entity will use the group access policy permissions at block 708 and continue to block 712. However, if it is determined that group access policy does not apply at block 706, then the data path entity will continue to analyze the user role permissions and use the user role permissions at block 710 before continuing to block 712. For example, a data packet from a student trying to access an exam server can be first analyzed to see if a group access policy applies (e.g., if the student is in the same group as the exam server). If so, the group access policy permissions will be applied. However, if the group access policy does not apply (e.g., if the student is not in the same group as the exam server), than the standard user role permissions can be analyzed and used (e.g., those permissions established for the Student role).

At block 712, the data path entity can use the permissions from block 708 or block 710 to determine whether or not to allow transmission of the received data packet. If the permissions do not allow communication between the source device and the destination device, the process ends and the packet is not transmitted to the destination device. However, if the permissions do allow communication between the source device and the destination device, the data path entity will facilitate transmission of the data packet, as described in further detail above, at block 714.

Figure 8:
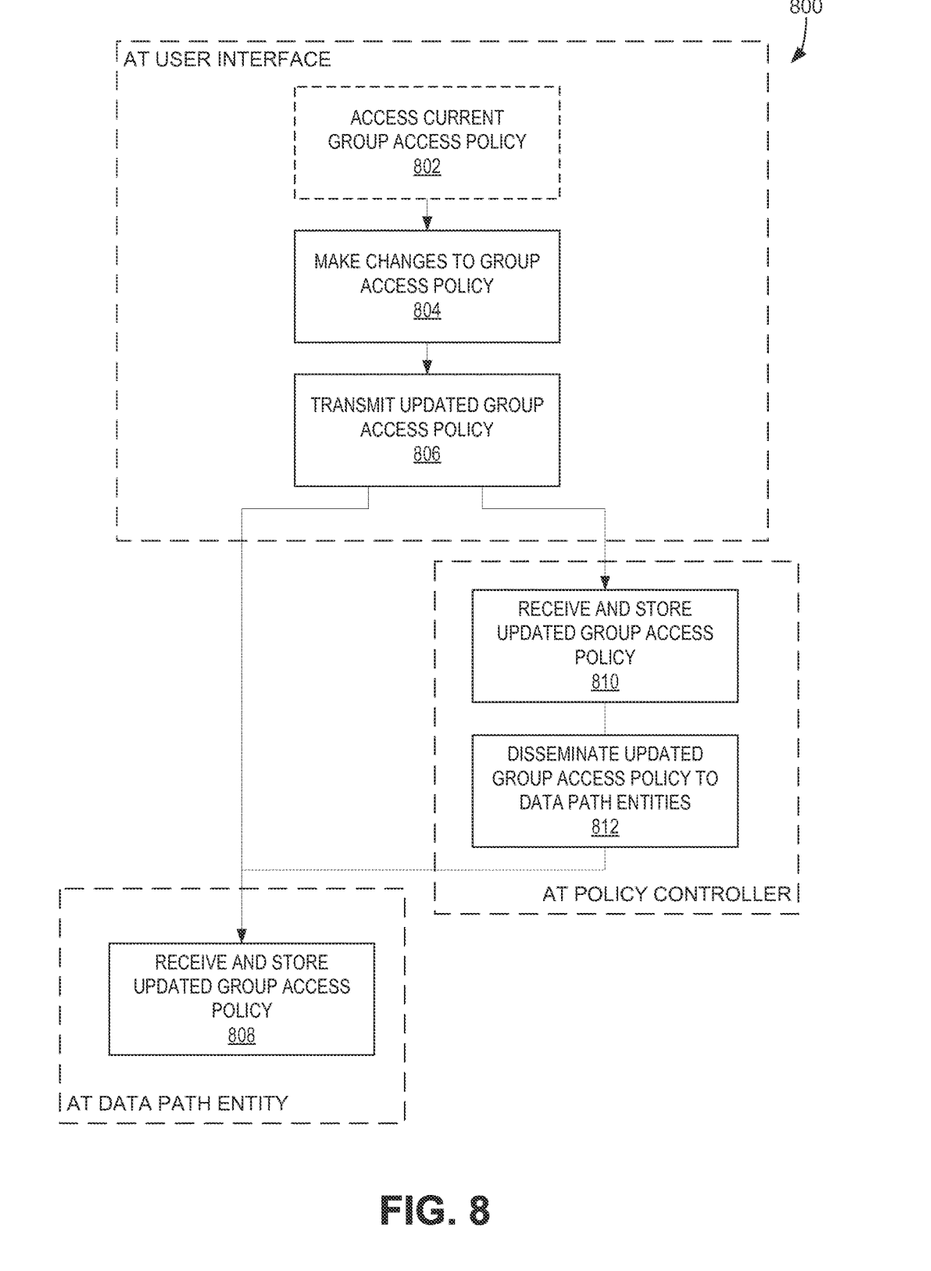
FIG. 8 is a flow chart depicting a method of updating a group access policy according to certain aspects of the present disclosure.

FIG. 8 is a flow chart depicting a method 800 of updating a group access policy according to certain aspects of the present disclosure. A group owner can use a user interface (e.g., an app on a smartphone or a website) to update a group access policy, such as to create, modify, or delete groups in the group access policy. At optional block 802, the current group access policy can be accessed. At block 804, changes can be made to the group access policy. A group owner can make these changes by using a user interface to perform operations such as creating a new group, adding members to a group, removing members from a group, adding permissions or rules to the group as a whole or to individual members of the group, removing themselves from a group, or performing other tasks. At block 806, the updated group access policy can be transmitted to the appropriate destination.

In some embodiments, one or more data path entities store and manage the group access policy and therefore the updated group access policy can be transmitted at block 806 directly to the data path entity, where it will be received and stored at block 808.

In some embodiments, a policy controller can be used to handle and disseminate updates to the group access policy. The policy controller can be implemented on a data path entity or a separate device. When a policy controller is used, the updated group access policy transmitted at block 806 can be transmitted to the policy controller where it is received and stored at block 810. Thereafter, the policy controller can disseminate the updated group access policy to any necessary data path entities at block 812, after which the updated group access policy would be received and stored by the data path entities at block 808.

Figure 9:
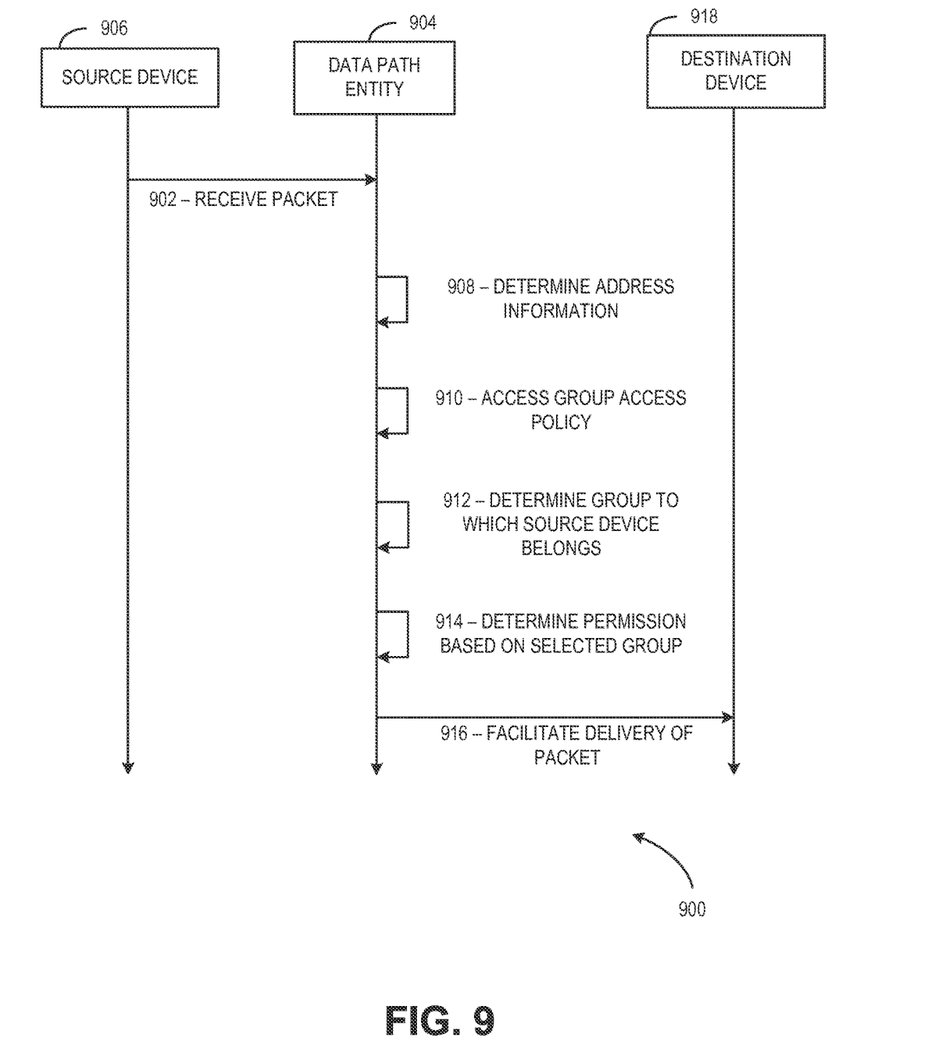
FIG. 9 is a schematic depiction of a method of using a group access policy to facilitate delivery of network communications according to certain aspects of the present disclosure.

FIG. 9 is a schematic depiction of a method 900 of using a group access policy to facilitate delivery of network communications according to certain aspects of the present disclosure. A source device 906 can transmit a packet that is destined for a destination device 918. The data path entity 904 can receive the packet at 902. At 908, the data path entity 904 can determine address information from the packet. At 910, the data path entity 904 can access the group access policy. At 912, the data path entity 904 can determine one or more groups to which the source device belongs. At 914, the data path entity 904 can determine a permission based on the selected one or more groups, the permission indicative of whether the source device 906 is permitted to communicate with the destination device 918. If the source device 906 is indeed permitted to communicate with the destination device 918, the data path entity 904 can facilitate delivery of the packet to the destination device 918 at 916. The various processes described with reference to method 900 can be performed as described in further detail above.

Merely by way of example, one or more procedures described with respect to the processes or methods discussed above may be implemented as code and/or instructions executable by a computer or device (and/or a processor within a computer or device); in an aspect, then, such code and/or instructions can be used to configure and/or adapt a general purpose computer (or other device) to perform one or more operations in accordance with the described methods. Such functions or code may include code to perform any of the steps described above. The memory may be a non-transitory machine-readable storage medium, processor-readable memory, and/or a computer-readable memory that stores the one or more computer-program products configured to cause the processor(s) to perform the functions described. In other embodiments, one or more of the functions described may be performed in hardware. Aspects of the disclosed methods, when performed by a general purpose computer, allow the general purpose computer to perform more efficiently, such as by performing an operation in fewer steps or using less memory or processing time, than prior methods. Further, performance of aspects of the disclosed methods by a general purpose computer may transform the general purpose computer into a special purpose computer, such as a network device, a wireless access point, a wireless client, etc. Aspects of the disclosed methods, when performed by a general purpose computer, further allow the general purpose computer to perform new functions and/or to perform functions in new ways, such as in more useful orders. For example, aspects of the disclosed methods achieve simplified and/or more efficient operation of network devices, such as client devices and wireless access point, as well as efficiency gains in operation of wireless networking and use of the radio frequency medium.

A set of these instructions and/or code might be stored on a non-transitory machine-readable storage medium, such as the memory. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by a computer or device and/or might take the form of source and/or installable code, which, upon compilation and/or installation on the computer or device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system, comprising:
   one or more data processors; and
   a non-transitory computer readable storage medium containing instructions which when executed on the one or more data processors, cause the one or more data processors to perform operations that comprise:
   receive a data packet containing a payload, a source address indicative of a source device, and a destination address indicative of a destination device;
   access group access control information containing information for a plurality of groups, wherein:
     each group includes a group owner and a member list,
     for at least one of the plurality of groups, the member list is dynamically updatable based on physical interaction between the source device and a control device of the group owner without use of a wireless communication network, and
     each member on the list is associated with an address;
   determine that the source device belongs to a particular group by comparing the source address to the addresses associated with the members on the member lists;
   determine a permission for the particular group; and
   facilitate delivery of the payload to the destination device based on the determined permission.

2. The system of claim 1, wherein to determine the permission is further based on an existing permission of the group owner of the particular group.

3. The system of claim 1, wherein to determine the permission includes to determine whether the destination device belongs to the particular group by comparing the destination address to the addresses associated with the members on the member list of the particular group.

4. The system of claim 1, wherein for each of the plurality of groups, the group owner can dynamically update the member list.

5. The system of claim 1, wherein the source device is located on a source logical network and the destination device is located on a destination logical network that is distinct from the source logical network, wherein to receive the data packet includes to receive the data packet on the source logical network, and wherein to facilitate delivery of the payload to the destination device includes to facilitate transmission of the payload on the destination logical network.

6. The system of claim 1, wherein the destination address is a multicast address indicative of a plurality of destination devices each having a destination address, wherein to determine the permission includes to determine a set of allowed destination addresses indicative of those destination devices that belong to the particular group by comparing the plurality of destination addresses to the addresses associated with the members on the member list of the particular group, and wherein to facilitate delivery of the payload to the destination device includes transmission of new data packets to each of the set of allowed destination addresses, wherein each of the new data packets contain the payload.

7. The system of claim 1, wherein the destination address is a multicast address indicative of a plurality of destination devices each having a destination address, wherein to determine the permission includes to determine a set of allowed destination devices that belong to the particular group by comparing the plurality of destination addresses to the addresses associated with the members on the member list of the particular group, wherein to determine the permission further includes to determine a set of access points being used by the set of allowed destination devices, and wherein to facilitate delivery of the payload to the destination device results in the transmission of a new multicast packet from each of the set of access points, wherein each of the new multicast packets includes the payload.

8. A computer-program product tangibly embodied in a non-transitory machine-readable storage medium, including instructions configured to cause a data processing apparatus to perform operations that comprise:
   receive a data packet containing a payload, a source address indicative of a source device, and a destination address indicative of a destination device;
   access group access control information containing information for a plurality of groups, wherein each group includes a group owner and a member list, and wherein each member on the list is associated with an address;
   determine that the source device belongs to a particular group by comparing the source address to the addresses associated with the members on the member lists;
   determine a permission for extension to the destination device to communicate with the particular group, wherein the permission extended to the destination device is limited to a set of permissions already extended to the group owner for use as a member of the particular group; and
   facilitate delivery of the payload to the destination device based on the determined permission.

9. The computer-program product of claim 8, wherein to determine the permission includes to determine whether the destination device belongs to the particular group by comparing the destination address to the addresses associated with the members on the member list of the particular group.

10. The computer-program product of claim 8, wherein for each of the plurality of groups, the group owner can dynamically update the member list.

11. The computer-program product of claim 10, wherein for at least one of the plurality of groups, the member list is dynamically updatable based on physical interaction between the source device and a control device of the group owner.

12. The computer-program product of claim 8, wherein the source device is located on a source logical network and the destination device is located on a destination logical network that is distinct from the source logical network, wherein to receive the data packet includes to receive the data packet on the source logical network, and wherein to facilitate delivery of the payload to the destination device includes to facilitate transmission of the payload on the destination logical network.

13. The computer-program product of claim 8, wherein the destination address is a multicast address indicative of a plurality of destination devices each having a destination address, wherein to determine the permission includes to determine a set of allowed destination addresses indicative of those destination devices that belong to the particular group by comparing the plurality of destination addresses to the addresses associated with the members on the member list of the particular group, and wherein to facilitate delivery of the payload to the destination device includes transmission of new data packets to each of the set of allowed destination addresses, wherein each of the new data packets contain the payload.

14. The computer-program product of claim 8, wherein the destination address is a multicast address indicative of a plurality of destination devices each having a destination address, wherein to determine the permission includes to determine a set of allowed destination devices that belong to the particular group by comparing the plurality of destination addresses to the addresses associated with the members on the member list of the particular group, wherein to determine the permission further includes to determine a set of access points being used by the set of allowed destination devices; and wherein to facilitate delivery of the payload to the destination device results in the transmission of a new multicast packet from each of the set of access points, wherein each of the new multicast packets includes the payload.

15. A computer-implemented method, comprising:
receiving, at a computing device, a data packet containing a payload, a source address indicative of a source device, and a destination address indicative of a destination device;
accessing group access control information containing information for a plurality of groups, wherein each group includes a group owner and a member list, and wherein:
inclusion on the member list is dependent on a user accepting an invitation from the group owner to be added as a member of a group, and
each member on the list is associated with an address;
determining that the source device belongs to a particular group by comparing the source address to the addresses associated with the members on the member lists;
determining a permission for the particular group; and
facilitating delivery of the payload to the destination device based on the determined permission.

16. The computer-implemented method of claim 15, wherein determining the permission is further based on an existing permission of the group owner of the particular group.

17. The computer-implemented method of claim 15, wherein determining the permission includes determining whether the destination device belongs to the particular group by comparing the destination address to the addresses associated with the members on the member list of the particular group.

18. The computer-implemented method of claim 15, wherein for each of the plurality of groups, the group owner can dynamically update the member list.

19. The computer-implemented method of claim 18, wherein for at least one of the plurality of groups, the member list is dynamically updatable based on physical interaction between the source device and a control device of the group owner.

20. The computer-implemented method of claim 15, wherein the source device is located on a source logical network and the destination device is located on a destination logical network that is distinct from the source logical network, wherein receiving the data packet includes receiving the data packet on the source logical network, and wherein facilitating delivery of the payload to the destination device includes facilitating transmission of the payload on the destination logical network.

21. The computer-implemented method of claim 15, wherein the destination address is a multicast address indicative of a plurality of destination devices each having a destination address, wherein determining the permission includes determining a set of allowed destination addresses indicative of those destination devices that belong to the particular group by comparing the plurality of destination addresses to the addresses associated with the members on the member list of the particular group, and wherein facilitating delivery of the payload to the destination device includes transmitting new data packets to each of the set of allowed destination addresses, wherein each of the new data packets contain the payload.

22. The computer-implemented method of claim 15, wherein the destination address is a multicast address indicative of a plurality of destination devices each having a destination address, wherein determining the permission includes determining a set of allowed destination devices that belong to the particular group by comparing the plurality of destination addresses to the addresses associated with the members on the member list of the particular group, wherein determining the permission further includes determining a set of access points being used by the set of allowed destination devices, and wherein facilitating delivery of the payload to the destination device results in the transmission of a new multicast packet from each of the set of access points, wherein each of the new multicast packets includes the payload.

* * * * *